United States Patent
Xu et al.

(10) Patent No.: US 7,646,750 B2
(45) Date of Patent: Jan. 12, 2010

(54) METHOD AND APPARATUS FOR PRECISE FIRST-PATH DETECTION IN CDMA MOBILE COMMUNICATIONS SYSTEM

(75) Inventors: Bin Xu, Guangdong (CN); Fangfu Guo, Guangdong (CN); Xinxi Diao, Guangdong (CN); Huanqiu Ye, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 379 days.

(21) Appl. No.: 10/558,829

(22) PCT Filed: May 28, 2004

(86) PCT No.: PCT/CN2004/000562

§ 371 (c)(1),
(2), (4) Date: Dec. 28, 2006

(87) PCT Pub. No.: WO2004/107778

PCT Pub. Date: Dec. 9, 2004

(65) Prior Publication Data

US 2007/0115870 A1 May 24, 2007

(30) Foreign Application Priority Data

May 28, 2003 (CN) .................................. 03 1 38560

(51) Int. Cl.
*H04B 7/216* (2006.01)
(52) U.S. Cl. ...................................... 370/335; 370/320
(58) Field of Classification Search ......... 375/347–352; 455/134–135; 370/335
See application file for complete search history.

(56) References Cited

U.S. PATENT DOCUMENTS

| 5,140,615 | A | * | 8/1992 | Jasper et al. .................. 375/347 |
| 7,133,436 | B2 | * | 11/2006 | Araya et al. .................. 375/148 |
| 2002/0110097 | A1 | | 8/2002 | Sugirtharaj |

(Continued)

FOREIGN PATENT DOCUMENTS

CN   1315792 A   10/2001

(Continued)

*Primary Examiner*—Nick Corsaro
*Assistant Examiner*—Munsoon Choo
(74) *Attorney, Agent, or Firm*—Slater & Matsil, L.L.P.

(57) ABSTRACT

The present invention relates to a method and apparatus of precise first-path detection in CDMA mobile communications systems, comprising the steps of: a. calculating the noise threshold for the first-path detection according to the multi-path profile; b. judging whether there is a maximum point exceeding the noise threshold in the multi-path profile, if yes, carrying out side-lobe suppression at this maximum point and obtaining the candidate first path; otherwise, setting the flag of no first path existing, and exiting the entire process of first-path detection; c. judging according to the location of the candidate first path whether the first path is ambiguous, if yes, carrying out correction of first-path ambiguity, obtaining the corrected location of final first path, and exiting the entire first-path detection process; otherwise, outputting the location of candidate first path as the location of final first path. The apparatus in accordance with this invention comprises at least a module for noise threshold calculation, a module for side-lobe suppression, and a module for first-path ambiguity detection and correction.

8 Claims, 6 Drawing Sheets

U.S. PATENT DOCUMENTS

| | | |
|---|---|---|
| 2002/0142782 A1 | 10/2002 | Berliner et al. |
| 2002/0149511 A1 | 10/2002 | Tsunehara et al. |
| 2004/0042411 A1* | 3/2004 | Dahlback et al. ............ 370/252 |

FOREIGN PATENT DOCUMENTS

| | | |
|---|---|---|
| EP | 1 126 626 A | 8/2001 |
| EP | 1126626 A2 * | 8/2001 |
| EP | 1 289 161 A | 3/2003 |
| GB | 2 381 978 | 5/2003 |
| KR | 2002031667 A | 5/2002 |

* cited by examiner

METHOD AND APPARATUS FOR PRECISE FIRST-PATH DETECTION IN CDMA MOBILE COMMUNICATIONS SYSTEM

CROSS REFERENCE TO RELATED APPLICATIONS

This application claims priority to Patent Cooperation Treaty (PCT) Application No. PCT/CN2004/000562 filed on May 28, 2004 entitled, Method and Apparatus for Precise First-Path Detection in CDMA Mobile Communications System, which claims priority to Chinese Patent Application No. 03138560.5, filed May 28, 2003, all of the above disclosures are herein incorporated by reference in their entirety.

FIELD OF THE TECHNOLOGY

The present invention relates to the mobile communications field, and particular to a method and apparatus of precise first-path detection for use in positioning user equipment (UE) in a CDMA mobile communications system.

BACKGROUND OF THE INVENTION

It is known that, in a CDMA mobile communications system, a signal transmitted from a base station will arrive at UE via different paths after different time delay because there are reflections of electro-magnetic waves. With matched filtering, UE will be able to obtain the multi-path profile. Likewise, a signal transmitted from UE will reach the base station via different paths. After matched filtering, the base station will also be able to obtain the appropriate multi-path profile.

The locations of several larger peaks in the multi-path profile are usually corresponding to the different propagation paths (simplified as path) of the signal, where the path with the shortest delay in the multi-path profile is referred to as the first path. It is seen from the above definition that the first path is corresponding to the shortest propagation path of signal between the base station and UE. Thus the purpose of first-path detection is to determine the location of the first path in the multi-path profile after the profile thereof is obtained.

First-path detection is the prerequisite of implementing UE positioning based on a cellulous mobile communications system, and the precision of UE positioning directly depends on the precision of first-path detection. For example, the WCDMA-based OTDOA-IPDL (Observed Time Difference Of Arrival-Idle Period Down Link) positioning method requires the measurement of some radio signals by UE or the base station, and the measurement includes SFN-SFN (System Frame Number) OTDOA Type 2 measurement at the UE side, UE Rx-Tx time difference Type 2 measurement, and the measurement of Round Trip Time (RTT) at the base-station side. Obtaining the values of the above measurements all depend on the first-path detection of the corresponding radio signals by UE or the base station. That is why the precision of first-path detection determines the precision of the values of the above measurement, and accordingly the positioning precision of this kind of UE positioning methods based on a wireless cellulous network.

In the past, the ordinary method of first-path detection is implemented in two steps. The first step: obtain the noise threshold of the multi-path profile; the second step: search the first maximum point exceeding the noise threshold in the multi-path profile, and the location of this maximum point will be determined as the first path.

The foregoing ordinary method of first-path detection takes no consideration of the impact of the following two factors on first-path detection: side-lobe and first-path ambiguity, leading to a larger error in the first-path detection in a relatively complicated radio propagation environment.

Figure 1:
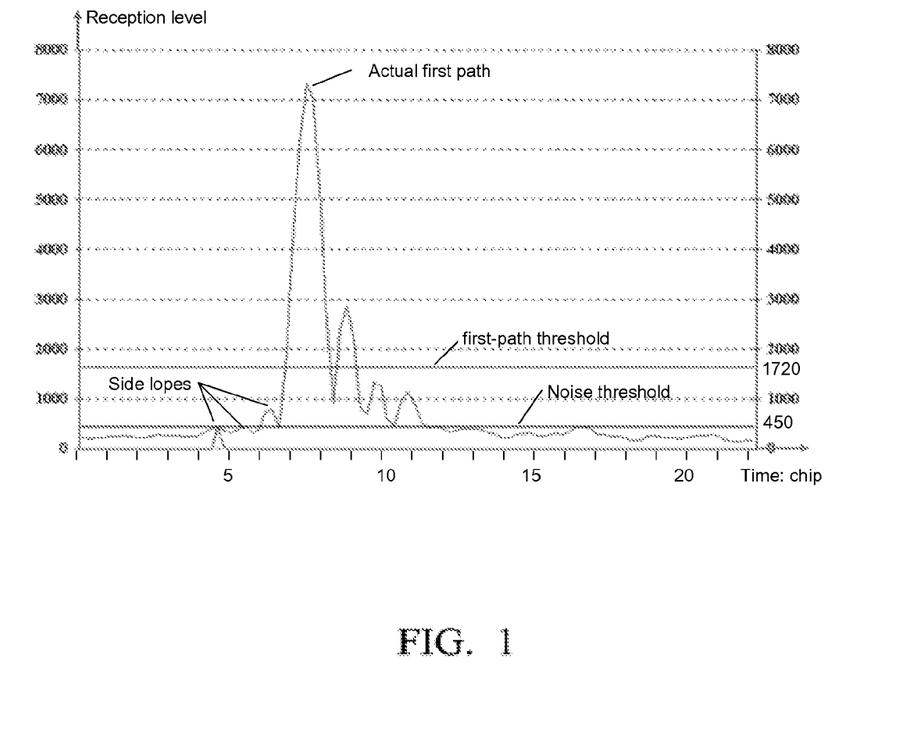
FIG. 1 shows the side-lobes in the prior art.

Typically, in a CDMA mobile communications system, transmitting and receiving radio signals will be implemented by low-pass shaping filtering, for instance, the RRC (Root Rising Cosine) filtering in a WCDMA system. The shape-filtered signal has un-ignorable side-lobes, which are other maximums in addition to each path in the shape-filtered signal and will appear on the left and right sides of each path after matched filtering at the receiving end of the radio signal. If a side-lobe at the left side of the first path exceeds the noise threshold, as shown in FIG. 1, the side-lobe at the left side of the first path will be falsely detected as the first path by the ordinary method, leading to a significant first path detection error.

Figure 2:
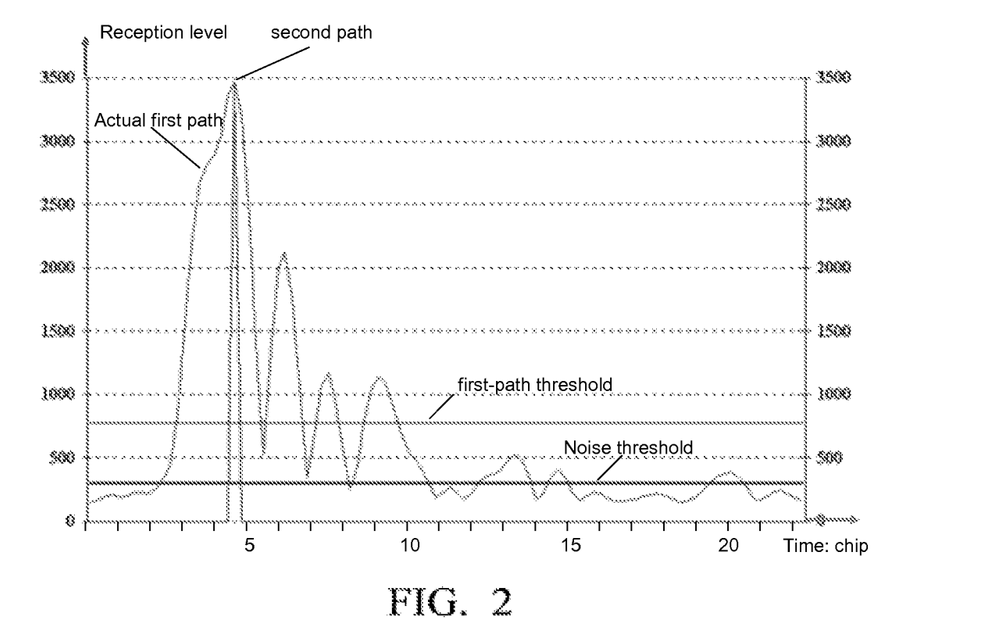
FIG. 2 shows the first-path ambiguity in the prior art.

In addition, there is the multi-path effect in the propagation of radio signals. When the amplitude, phase, and path spacing between different paths meet certain conditions, typically when there is a relatively small path spacing between the first path and the second path, for instance, the spacing of two paths less than two chips (corresponding to 160 meters), or when the second-path's power is equal to or stronger than the first-path's power, the second path will blur the maximum that the first path should have had, i.e. making it no longer a maximum. This is what is called first-path ambiguity. As shown in FIG. 2, the first path is ambiguous by the following second path, leading to the disappearance of the maximum at the first-path location. As a result, by the ordinary method of first-path detection, the following maximum (second path) will be falsely regarded as the first-path location, leading to a significant first path detection error.

Apart from that, in a digital CDMA mobile communications system, the received signal will be sampled in a finite rate. With the ordinary method of first-path detection, the first-path location is detected at the location of the maximum in the multi-path profile with discrete sample values, therefore, the first path thus detected can only be located at the discretely sampled maximum point. The resolution of the first-path depends on the spacing of the sampling points: the higher the sampling rate, the smaller the spacing between the two sampling points, and the higher the resolution of the first-path, making the detected points closer to the real first-path location. With the ordinary method of first-path detection, however, only finite rate first-path resolution can be achieved.

SUMMARY OF THE INVENTION

The objective of this invention is to provide a method and apparatus of precise first-path detection in CDMA mobile communications systems, and the invention includes following technical scheme:

A method of precise first-path detection in CDMA mobile communications systems, the method comprising the steps of:

a. calculating the noise threshold for the first-path detection according to the multi-path profile;

b. judging whether there is a maximum point exceeding the noise threshold in the multi-path profile, if yes, carrying out side-lobe suppression at the maximum point which exceeds the noise threshold and obtaining candidate first path; otherwise, deciding that no first path exists, and exiting the entire process of first-path detection;

c. judging according to the location of the candidate first path whether the first path is ambiguous, if yes, carrying out correction of first-path ambiguity, and outputting the corrected location of final first path; otherwise, outputting the location of candidate first path as the location of final first path.

In step c, if the first path is not ambiguous, before outputting the location of final first path, the method further comprising:

Step d: carrying out conic interpolation computation for the candidate first path and obtaining the location of final first path according to the result of the interpolation computation.

The said side-lobe suppression in step b comprising:

b1. from the starting location of the multi-path profile to the end of the multi-path profile, searching the location of the first maximum point exceeding the noise threshold of the profile thereof;

b2. finding the location of the largest power value within N chips after the location of the current maximum point;

b3. judging whether the largest power value in step b2 is larger than the power value at the location of the current maximum point by M dB or more, if yes, going to step b4; otherwise going to step b5;

b4. from the next sampling point after the location of the current maximum point, searching in the multi-path profile the location of the first maximum point exceeding the noise threshold and taking this location as the location of the current maximum point, and then returning to step b2;

b5. making the location of the current maximum point as the location of the candidate first path;

where the feasible range of value of N is from 3.5 to 4.0, and the feasible range of value of M is from 12 to 14.

The said judging in step c whether the first path is ambiguous comprising:

c1. calculating the threshold for first-path ambiguity detection;

c2. from the location of the candidate first path to the starting location, searching the first location where the power is lower than the threshold for first-path ambiguity detection, Then moving to the next sampling point to obtain the first location where the power is higher than the threshold for first-path ambiguity detection;

c3. judging whether the spacing between the candidate first-path location and the first location where the power is higher than the threshold for first-path ambiguity detection is no less than 1.5 chips, if yes, the first path is ambiguous; otherwise, the first path is not ambiguous.

The procedure of calculating the threshold for first-path ambiguity detection in step c1 comprising:

subtracting the power of the candidate first path by M dB to obtain the first-path threshold, taking the larger value between the first-path threshold and the noise threshold as the threshold for first-path ambiguity decision; where the feasible range of the value of M is from 12 to 14.

The said correction of first-path ambiguity in step c comprising:

obtaining the said location of final first path by moving NUM1 chips towards the right from the first location where the power is higher than the threshold for first-path ambiguity detection, where the feasible range of the value of NUM1 is from 0.9 to 1.1

The said correction of first-path ambiguity in step c comprising:

obtaining the said location of final first path by moving NUM2 chips towards the left from the candidate first-path location, where the feasible range of the value of NUM2 is from 0.9 to 1.1.

The said correction of first-path ambiguity in step c comprising:

determining the location of the inflection point in the points sequence composed of sampling points between the candidate first-path location and the first location where the power is higher than the threshold for first-path ambiguity detection and taking this inflection point as the said location of final first path.

In step d, the said conic interpolation computation is carried out according to the following conic interpolation formula for first-path calibration:

$$FP = X1 + (Y0 - Y2)/(2*(Y0 - 2*Y1 + Y2))$$

When both Y0 and Y2 exist;

$$FP = X1$$

When Y0 or Y2 does not exit;

wherein, FP is the calibrated location of final first path, the location of candidate first path location is X1; the location of the sampling point to the left of the candidate first path is X0; the location of the sampling point to the right of the candidate first path is X2; and correspondingly, the power at the candidate first-path location is Y1; the power at the sampling point to the left of the candidate first path is Y0; the power at the sampling point to the right of the candidate first path is Y2.

The invention also provides an apparatus of precise first-path detection in CDMA mobile communications systems, the apparatus comprising at least a module for noise threshold calculation, a module for side-lobe suppression, and a module for first-path ambiguity detection and correction, wherein:

the module for noise threshold calculation is for use in receiving the multi-path profile from the matched filtering module, calculating the noise threshold for the first-path detection according to this multi-path profile, and then outputting this noise threshold to the module for side-lobe suppression;

the module for side-lobe suppression is for use in finding the candidate first path and carrying out side-lobe suppression based on the received noise threshold using the processing method of side-lobe suppression, and then outputting the candidate first path to the module for first-path ambiguity detection and correction; and the module for first-path ambiguity detection and correction is for use in carrying out first-path ambiguity detection according to the received location of the candidate first path, if there is first-path ambiguity, making first-path ambiguity correction to obtain the corrected location of final first path; if there is no first-path ambiguity, just outputting the location of candidate first path.

the apparatus further comprising: a module for conic interpolation, which is for use in receiving the candidate first path without first-path ambiguity from the module for first-path ambiguity detection and correction, calculating the location of final first path according to the conic interpolation formula for first-path calibration, and outputting the calibrated location of final first path.

The method and apparatus of first-path detection in accordance with this invention have the following three merits:

1. capable of automatically identifying and removing side-lobes so that the precision of first-path detection is no longer affected by side-lobes;

2. capable of automatically judging whether the first path is ambiguous, and carrying out precise correction of the first path in case of first-path ambiguity so that the precision of first-path detection is no longer affected by first-path ambiguity;

3. capable of improving the resolution of first-path detection result by using the conic interpolation computation so that the resolution of first-path detection result is sampling rate independent.

DETAILED DESCRIPTION OF THE EMBODIMENT

In order to make this invention more understandable, specific implementation of this invention is hereinafter described with reference to the drawings accompanying the description.

This invention provides a method and apparatus for precise first-path detection in CDMA mobile communications systems. By adopting the approaches of side-lobe suppression, first-path ambiguity detection and correction, and conic interpolation, this invention overcomes the foregoing shortcomings caused by side-lobe and first-path ambiguity which the ordinary method of first-path detection can not overcome, as well as solve the problem of constrained first-path resolution. Applications of this invention will greatly improve the precision of UE positioning in CDMA mobile communications systems.

Figure 3:
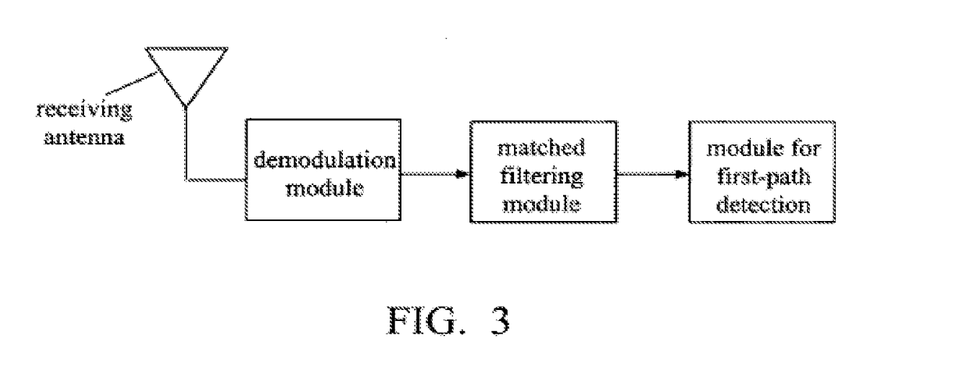
FIG. 3 shows the receiving of radio signal and first-path detection in the prior art.
Figure 4:
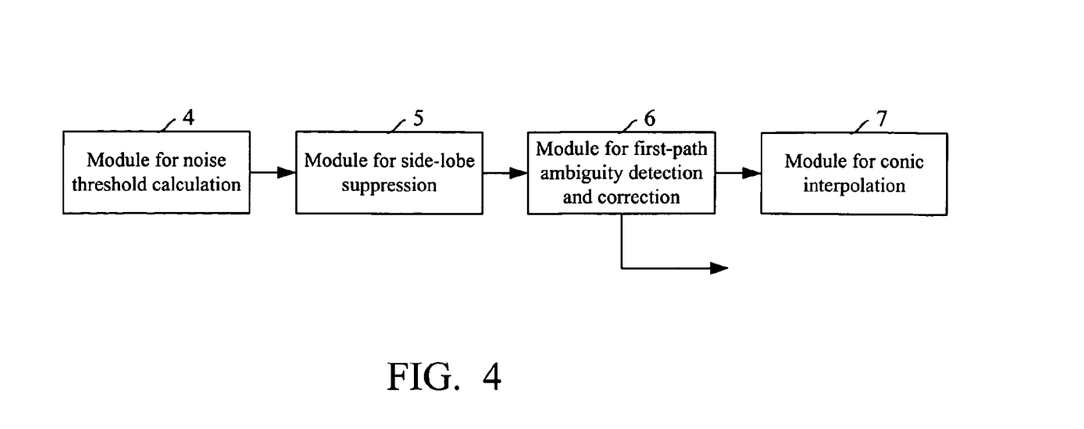
FIG. 4 shows each module in the first-path detection process in accordance with embodiment of the present invention.

FIG. 3 shows a typical process of receiving radio signals and making first-path detection in a CDMA mobile communications system. First the demodulation module demodulates the received signal to the base band, then the matched filtering module outputs the multi-path profile to the module for first-path detection after matched filtering, and the module for first-path detection continues to complete the entire process of first-path detection and finally outputs the first-path information. The method of first-path detection in accordance with this invention is also based on the above process of receiving radio signals and making first-path detection. In this invention, the apparatus provided by this invention is used as the said module for first-path detection. As shown in FIG. 4, the apparatus provided by this invention comprises at least: module for noise threshold calculation 4, module for side-lobe suppression 5, module for first-path ambiguity detection and correction 6, and module for conic interpolation 7.

The module for noise threshold calculation 4 is for use in receiving the multi-path profile from the matched filtering module, calculating the noise threshold for the first-path detection according to this multi-path profile, and then outputting this noise threshold to the module for side-lobe suppression 5; the module for side-lobe suppression 5 is for use in finding the first path and carrying out side-lobe suppression based on the received noise threshold using the processing method of side-lobe suppression, and then outputting the candidate first path to the module for first-path ambiguity detection and correction 6; the module for first-path ambiguity detection and correction 6 is for use in carrying out first-path ambiguity detection according to the location of the received candidate first path, if there is first-path ambiguity, make first-path ambiguity correction to obtain the corrected location of final first path; if there is no first-path ambiguity, just output the candidate first path to the module for conic interpolation 7; the module for conic interpolation 7 is for use in receiving the candidate first path without first-path ambiguity from the module for first-path ambiguity detection and correction 6, completing the calibration of the location of final first path according to the conic interpolation formula for first-path calibration, and outputting the location of final first path. In other embodiments of this invention, the apparatus of first-path detection may not include the module for conic interpolation 7, which will not affect the implementation of this invention.

Corresponding to the apparatus of first-path detection provided by this invention, the method of first-path detection in accordance with this invention comprises the steps of:

a. The module for noise threshold calculation 4 receives the multi-path profile from the matched filtering module, calculates the noise threshold for the first-path detection by the conventional method, and outputs this noise threshold to the module for side-lobe suppression 5.

b. The module for side-lobe suppression 5 receives the noise threshold inputted from the module for noise threshold calculation 4, and finds the first path and carries out the side-lobe suppression according to the noise threshold and by means of the processing method of side-lobe suppression. If no points in the multi-path profile is found to have power exceeding the noise threshold, set a flag of no first path existing and exit the entire process of first-path detection; otherwise, output the candidate first path to the module for first-path ambiguity detection and correction 6.

c. The module for first-path ambiguity detection and correction 6 receives the candidate first path outputted from the module for side-lobe suppression 5, carries out the processing of first-path ambiguity detection according to the location of the candidate first path, and obtains the flag indicating whether the first path is ambiguous. If the first path is ambiguous, continue with the processing of first-path calibration, obtain the corrected location of final first path, and exit the entire process of first-path detection; otherwise, just output the candidate first path received from the module for side-lobe suppression 5 to the module for conic interpolation 7. The module 7 carries out the conic interpolation processing of the candidate first path and obtains the location of final first path before outputting it. In other embodiments of this invention, the candidate first path that is not ambiguous may be directly outputted as the location of final first path, which will not affect the implementation of this invention.

In the embodiments of this invention, in order to solve the problem that the resolution of first-path detection is constrained, if the first path is detected in step c to be not ambiguous, further output the candidate first path to the module for conic interpolation 7 and the method further comprises the step d as follows:

Step d: The module for conic interpolation 7 receives the candidate first path outputted from the module for first-path ambiguity detection and correction 6, selects the candidate first path and two sampling points to the left and right thereof to simulate a conic curve, and obtains the location of the final first path according to the maximum of this conic curve; in the embodiments of this invention, the module will complete the computation of the location of the final first path according to the conic interpolation formula for first-path calibration (1), output the location of the final first path, and exit the entire process of first-path detection. The conic interpolation formula for first-path calibration (1) is as follows:

$$FP=X1+(Y0-Y2)/(2*(Y0-2*Y1+Y2))$$

When both Y0 and Y2 exist;

$$FP=X1$$

When Y0 or Y2 does not exit;

Wherein, FP is the calibrated location of final first path, the location of candidate first-path location is X1; the location of the sampling point to the left of the candidate first path is X0; the location of the sampling point to the right of the candidate first path is X2; correspondingly, the power at the candidate first-path location is Y1; the power at the sampling point to the left of the candidate first path is Y0; the power at the sampling point to the right of the candidate first path is Y2. In the formula (1), FP is the maximum of the conic section simulated by means of X0, X1, and X2.

Hereinafter, the specific implementation of each of the above steps is described in detail:

1. In step a, the implementation of calculating the noise threshold for first-path detection mainly comprises:

In the multi-path profile, removing the six largest maximums as well as the sampling points within one chip to the left and right of each of the six largest maximums, taking the average value of the remaining sampling points as the mean value of noise E, and using NN*E as the noise threshold, where NN is a constant of empirical constant value, and 1.9 is taken as NN in the embodiment of this invention. In other embodiments of this invention, the value of NN may be taken from 1.7 to 2.1 according to practical requirements, which will not affect the implementation of this invention.

Figure 5:
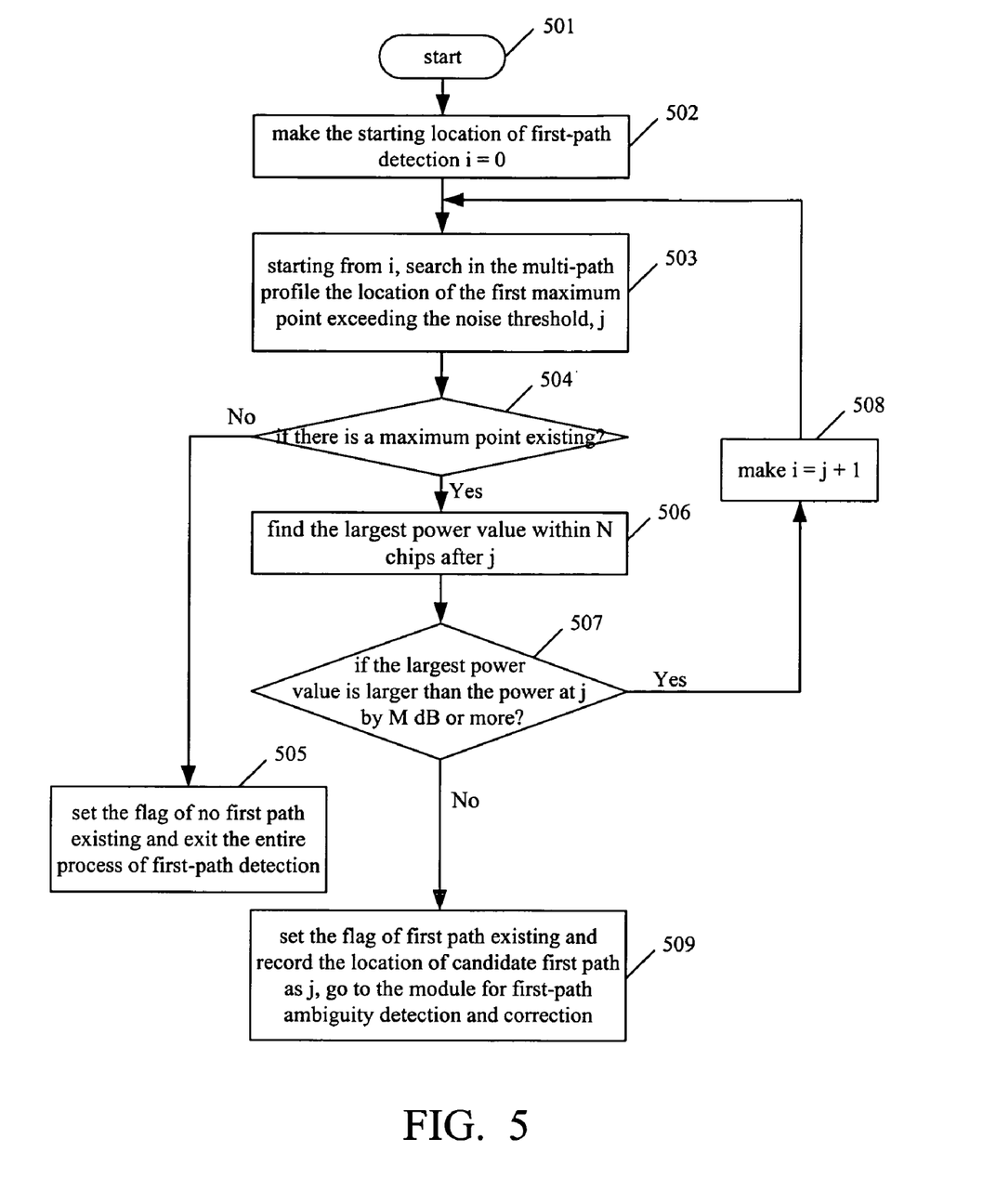
FIG. 5 is the flowchart of side-lobe suppression in accordance with embodiment of the present invention.

2. In step b, the implementation of side-lobe suppression is mainly as follows:

As shown in FIG. 5, in the embodiment of this invention, the module for side-lobe suppression 5 is used to implement the process of side-lobe suppression, and the major steps thereof comprise:

Step 501: receive the noise threshold outputted from the module for noise threshold calculation 4.

Step 502: make the starting location of first-path detection i=0, i.e. as the starting location of the multi-path profile.

Step 503: starting from i and toward to the right, search the location j of the first maximum point that exceeds the noise threshold.

Step 504: judge whether there is the maximum point that exceeds the noise threshold in the multi-path profile, if no, go to step 505; otherwise go to step 506.

Step 505: set the flag of no first path existing, and exit the entire process of first-path detection.

Step 506: find the largest value within N chips after j, where the feasible range of value of N is from 3.5 to 4.0.

Step 507: judge whether the above largest power value is larger than the power at location j by M dB or more, if yes, go to step 508; otherwise go to step 509, where M is an empirical value obtained based on many experiments and the feasible range of value thereof is from 12 to 14.

Step 508: take the next sampling point after j as i, and go to step 503.

Step 509: set the flag indicating that there is the first path, make the location of candidate first path as j, and go to the processing in the module for first-path ambiguity detection and correction 6.

By means of the foregoing process, a candidate first path can be found from the discretely distributed sampling points, and by comparing the powers as described in the above steps, the side-lobe problem in the first-path detection can be solved.

Figure 6:
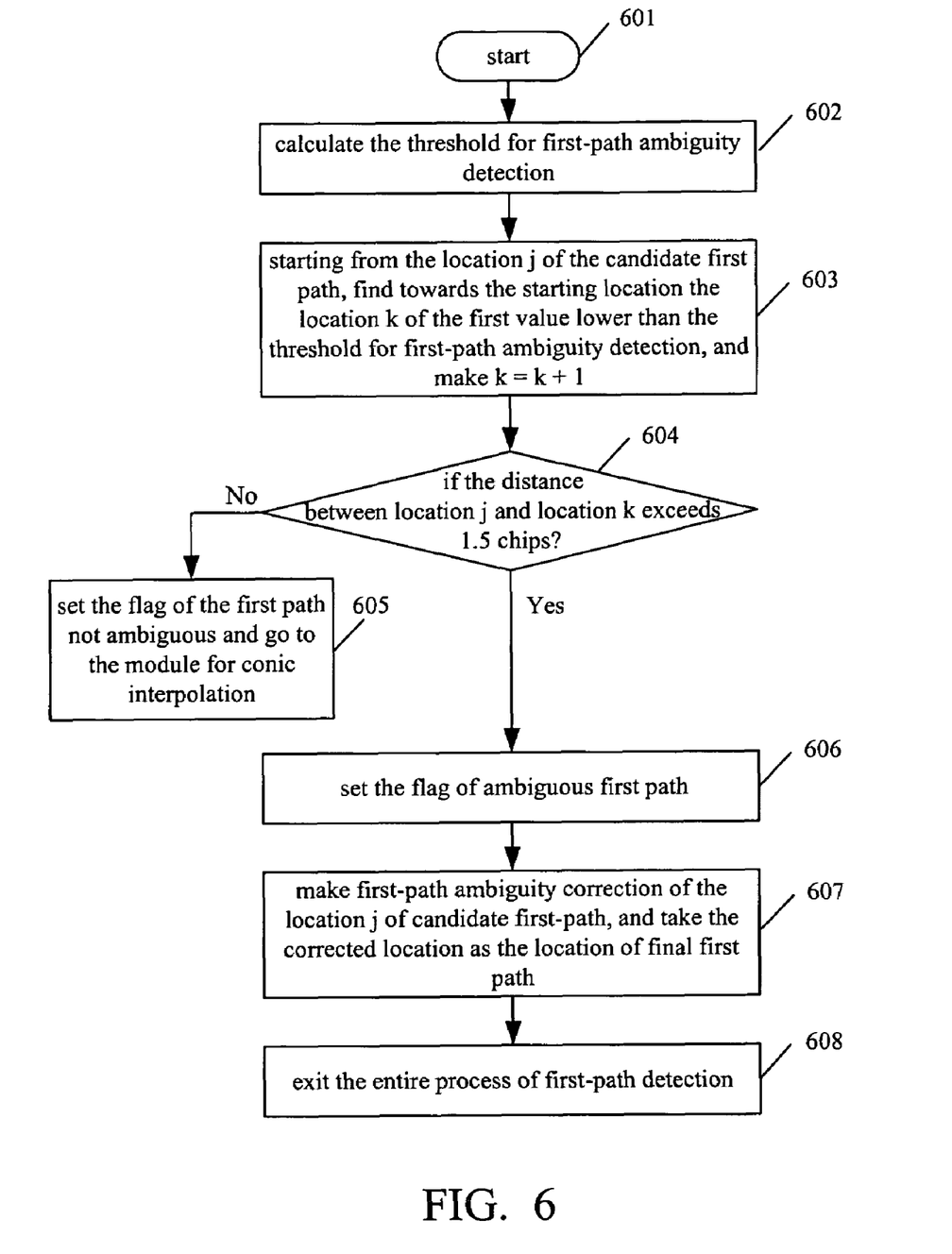
FIG. 6 is the flowchart of first-path ambiguity detection and correction in accordance with embodiment of the present invention.

3. In step c, the implementation of first-path ambiguity detection and correction is as follows:

The processing in the module for first-path ambiguity detection and correction is shown as FIG. 6, and the major steps thereof comprise:

Step 601: receive the candidate first path j outputted from the module for side-lobe suppression 5.

Step 602: calculate the threshold for first-path ambiguity detection. Make the first-path threshold as the power value of the first-path power minus M dB, then the threshold for first-path ambiguity detection will be the larger value between the first-path threshold and the noise threshold, where M is an empirical value obtained after many experiments with the feasible range of value from 12 to 14. The reason why the threshold for first-path ambiguity detection is the larger value between the first-path threshold and the noise threshold is:

The noise threshold can only suppress noise while the first-path threshold only suppresses side-lobes, then the larger of the two will be able to suppress both noise and side-lobes, thereby excluding both noise and side-lobes from the scope of the first-path ambiguity detection.

Step 603: starting from the location of the candidate first path j and toward the left, search the first location, k, where the power is lower than the threshold for first-path ambiguity detection, then make k=k+1 such that k currently represents the first location where the power is higher than the threshold for first-path ambiguity detection.

Step 604: judge whether the spacing between the location j and the location k is no less than 1.5 chips, if yes, it means that the first path is ambiguous, then go to step 606; otherwise, it means that the first path is not ambiguous, then go to step 605.

Figure 7:
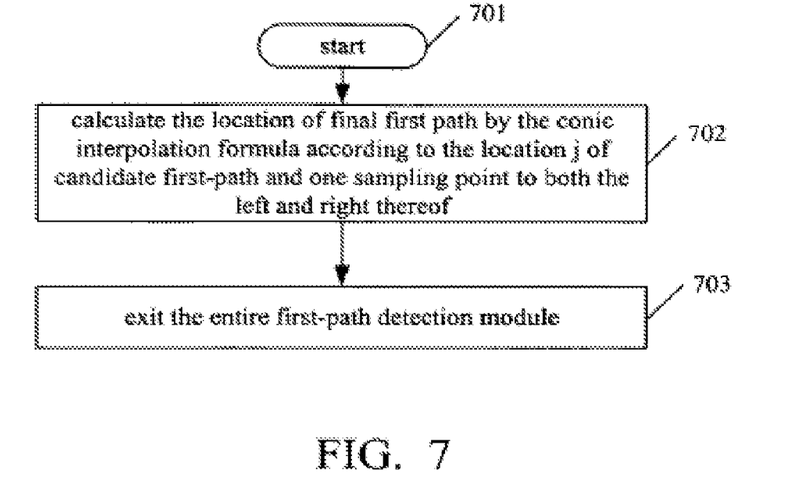
FIG. 7 is the flowchart of conic interpolation in accordance with embodiment of the present invention.

Step 605: as the result of detection in step 604 means that the first path is not ambiguous, set the flag in this step indicating that the first path is not ambiguous, and go to the processing step 701 of the module for conic interpolation 7.

Step 606: set the flag indicating that the first path is ambiguous.

Step 607: carry out first-path ambiguity correction on the candidate first path j and obtain the location of final first path, wherein, there are the following three methods of first-path ambiguity correction:

Method 1 for first-path ambiguity correction: the final first path is at the location NUM1 chips right of the location k, where NUM1 is an empirical value obtained after many experiments with the feasible range of value from 0.9 to 1.1.

Method 2 for first-path ambiguity correction: the final first path is at the location NUM2 chips left of the location j, where NUM2 is an empirical value obtained after many experiments with the feasible range of value from 0.9 to 1.1.

Method 3 for first-path ambiguity correction: the final first path is at the location of the inflection point of the points sequence consisting of the sampling points between j and k.

This invention selects anyone of the above three methods for correction to implement first-path ambiguity correction. The implementing effect of the above three methods are the same, which method for correction of the three is selected does not affect the implementation of this invention.

Step 608: exit the entire process of the first-path detection.

4. In step d, implementing the calibration of conic interpolation and obtaining the location of the final first path according to the maximum of this conic curve comprises the following major steps carried out by the module for conic interpolation 7, as shown in FIG. 7:

Step 701: receive the candidate first path j without first-path ambiguity outputted by the module for first-path ambiguity detection and correction 6.

Step 702: complete the calibration of the location of final first path according to the conic interpolation formula for first-path calibration (1), and output the location of the final first path.

Step 703: exit the entire process of first-path detection.

Figure 8:
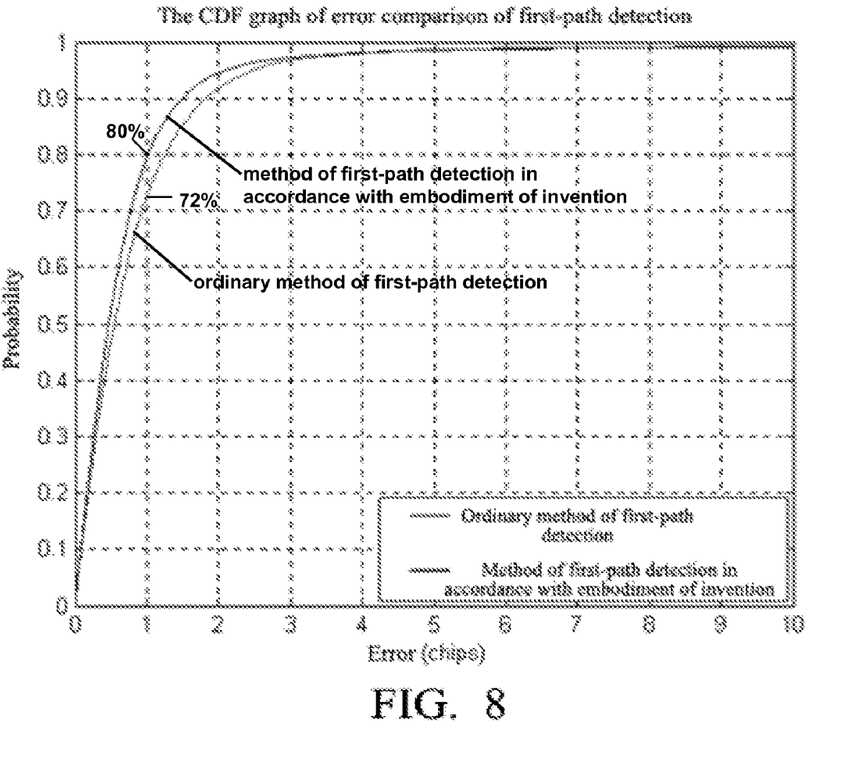
FIG. 8 is a graph comparing the errors in different approaches of first-path detection.

The improving effect of this invention has been proved and verified by field tests. The field testing environment includes a plurality of typical urban and suburb environments, where the multi-path propagation circumstances are relatively complicated with many side-lobes and cases of first-path ambiguity that have impact on the precision of first-path detection, and even with NLOS (None Line Of Sight) propagation errors which the present algorithm is unable to remove completely. The results of field tests show that the ordinary algorithm of first-path detection is unable to solve the problems of side-lobe and first-path ambiguity and results in rather large errors of first-path detection, while the method of first-path detection in accordance with this invention provides a good solution to the above problems of side-lobes and first-path ambiguity. Thus, there is great improvement in performance of the method of this invention compared with the ordinary method of first-path detection. The statistics of the testing results of the present invention compared with the ordinary method of first-path detection are shown as Table 1, and in addition, FIG. 8 shows the graph of the CDF (Cumulative Distribution Function) of the two methods. It can be seen from Table 1 and FIG. 8 that, with the application of this invention, not only the mean value of the errors of first-path detection is lowered, but the variance thereof is decreased. Compared with the ordinary method of first-path detection, this invention results in great improvement in the precision of first-path detection.

TABLE 1

Comparison of errors by different methods of first-path detection

| Method | Mean error (chips) | Variance of error (chips) |
|---|---|---|
| Ordinary method of first-path detection | 1.2 | 4.3 |
| Method of first-path detection in accordance with this invention | 0.7 | 2.5 |

The above description is only the preferred embodiment of the present invention while the protection scope thereof is not restricted by the description. Any variations and replacements within the technical range disclosed by this invention that easily occurs to persons skilled in the art should be under the coverage of the protection scope of this invention. Therefore, the protection scope of this invention should be as prescribed by the claims thereof.

The invention claimed is:

1. A method of precise first-path detection in CDMA mobile communications systems, the method comprising the steps of:
   a. calculating a noise threshold for the first-path detection according to a multi-path profile;
   b. judging whether there is a maximum point exceeding the noise threshold in the multi-path profile, and, if yes, carrying out side-lobe suppression at the maximum point which exceeds the noise threshold and obtaining a candidate first path; otherwise, deciding that no first path exists, and exiting the entire process of first-path detection;
   c. judging, according to the location of the candidate first path whether the first path is ambiguous, and if yes, carrying out correction of first-path ambiguity and outputting the corrected location of final first path; otherwise, outputting the location of candidate first path as the location of final first path;

said carrying out side-lobe suppression in step b comprising:
   b1. from a starting location of the multi-path profile to an end of the multi-path profile, searching the location of the first maximum point exceeding the noise threshold of the profile thereof;
   b2. finding the location of the largest power value within N chips after the location of the current maximum point;
   b3. judging whether the largest power value in step b2 is larger than the power value at the location of the current maximum point by M dB or more and, if yes, going to step b4; otherwise going to step b5;
   b4. from the next sampling point after the location of the current maximum point, searching in the multi-path profile the location of the first maximum point exceeding the noise threshold and taking this location as the location of the current maximum point, and then returning to step b2;
   b5. making the location of the current maximum point as the location of the candidate first path;

where the feasible range of value of N is from 3.5 to 4.0, and the feasible range of value of M is from 12 to 14.

2. A method according to claim 1, in step c, if the first path is not ambiguous, before outputting the location of final first path, the method further comprising:
   Step d: carrying out conic interpolation computation for the candidate first path and obtaining the location of final first path according to the result of the interpolation computation.

3. A method of precise first-path detection in CDMA mobile communications systems, the method comprising the steps of:
   a. calculating a noise threshold for the first-path detection according to a multi-path profile;
   b. judging whether there is a maximum point exceeding the noise threshold in the multi-path profile, and, if yes, carrying out side-lobe suppression at the maximum point which exceeds the noise threshold and obtaining a candidate first path; otherwise, deciding that no first path exists, and exiting the entire process of first-path detection;
   c. judging, according to the location of the candidate first path whether the first path is ambiguous, and if yes, carrying out correction of first-path ambiguity and outputting the corrected location of final first path; otherwise, outputting the location of candidate first path as the location of final first path;

said judging in step c whether the first path is ambiguous comprising:
   c1. calculating the threshold for first-path ambiguity detection;
   c2. from the location of the candidate first path to the starting location, searching the first location where the power is lower than the threshold for first-path ambiguity detection, then moving to the next sampling point to obtain the first location where the power is higher than the threshold for first-path ambiguity detection;
   c3. judging whether the spacing between the candidate first-path location and the first location where the power is higher than the threshold for first-path ambiguity detection is no less than 1.5 chips, if yes, the first path is ambiguous; otherwise, the first path is not ambiguous.

4. A method according to claim 3, the procedure of calculating the threshold for first-path ambiguity detection in step c1 comprising:
subtracting the power of the candidate first path by M dB to obtain the first-path threshold, taking the larger value between the first-path threshold and the noise threshold as the threshold for first-path ambiguity decision; where the feasible range of the value of M is from 12 to 14.

5. A method according to claim 3, said correction of first-path ambiguity in step c comprising:
obtaining said location of final first path by moving NUM1 chips towards the right from the first location where the power is higher than the threshold for first-path ambiguity detection, where the feasible range of the value of NUM1 is from 0.9 to 1.1.

6. A method according to claim 3, said correction of first-path ambiguity in step c comprising:
obtaining said location of final first path by moving NUM2 chips towards the left from the candidate first-path location, where the feasible range of the value of NUM2 is from 0.9 to 1.1.

7. A method according to claim 3, said correction of first-path ambiguity in step c comprising:
determining the location of the inflection point in the points sequence composed of sampling points between the candidate first-path location and the first location where the power is higher than the threshold for first-path ambiguity detection and taking this inflection point as said location of final first path.

8. A method of precise first-path detection in CDMA mobile communications systems, the method comprising the steps of:
a. calculating a noise threshold for the first-path detection according to a multi-path profile;
b. judging whether there is a maximum point exceeding the noise threshold in the multi-path profile, and, if yes, carrying out side-lobe suppression at the maximum point which exceeds the noise threshold and obtaining a candidate first path; otherwise, deciding that no first path exists, and exiting the entire process of first-path detection;
c. judging, according to the location of the candidate first path whether the first path is ambiguous, and if yes, carrying out correction of first-path ambiguity and outputting the corrected location of final first path; otherwise, outputting the location of candidate first path as the location of final first path;
d. carrying out conic interpolation computation for the candidate first path and obtaining the location of final first path according to the result of the interpolation computation;
said conic interpolation computation being carried out according to the following conic interpolation formula for first-path calibration:

$$FP=X1+(Y0-Y2)/(2*(Y0-2*Y1+Y2))$$

When both Y0 and Y2 exist;

$$FP=X1$$

When Y0 or Y2 does not exit;
wherein, FP is the calibrated location of final first path, the location of candidate first path location is X1; the location of the sampling point to the left of the candidate first path is X0; the location of the sampling point to the right of the candidate first path is X2; and correspondingly, the power at the candidate first-path location is Y1; the power at the sampling point to the left of the candidate first path is Y0; the power at the sampling point to the right of the candidate first path is Y2.

* * * * *

UNITED STATES PATENT AND TRADEMARK OFFICE
CERTIFICATE OF CORRECTION

PATENT NO. : 7,646,750 B2  Page 1 of 1
APPLICATION NO. : 10/558829
DATED : January 12, 2010
INVENTOR(S) : Xu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 653 days.

Signed and Sealed this

Sixteenth Day of November, 2010

David J. Kappos
*Director of the United States Patent and Trademark Office*